US008873380B2

(12) United States Patent
Tochio

(10) Patent No.: US 8,873,380 B2
(45) Date of Patent: Oct. 28, 2014

(54) SYSTEM AND METHOD FOR SETTING REDUNDANT PATH SEGMENTS IN A MULTI-RING COMMUNICATION NETWORK

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/401,209

(22) Filed: Feb. 21, 2012

(65) Prior Publication Data

US 2012/0236710 A1 Sep. 20, 2012

(30) Foreign Application Priority Data

Mar. 15, 2011 (JP) .................................. 2011-057286

(51) Int. Cl.
*G01R 31/08* (2006.01)
*H04L 12/40* (2006.01)
*H04L 12/427* (2006.01)
*H04L 12/46* (2006.01)
*H04L 12/437* (2006.01)

(52) U.S. Cl.
CPC ........ *H04L 12/427* (2013.01); *H04L 12/40189* (2013.01); *H04L 12/4637* (2013.01); *H04L 12/437* (2013.01)
USPC .......................................................... 370/228

(58) Field of Classification Search
CPC .................... H04L 12/40189; H04L 12/437
USPC .......................................................... 370/228
See application file for complete search history.

(56) References Cited

U.S. PATENT DOCUMENTS

| 5,216,670 | A | * | 6/1993 | Ofek et al. ..................... 370/403 |
| 7,394,776 | B2 | * | 7/2008 | Lee et al. ....................... 370/310 |
| 7,633,854 | B2 | * | 12/2009 | Saleh et al. .................... 370/216 |
| 7,633,857 | B2 | * | 12/2009 | Fujii et al. ...................... 370/223 |
| 7,876,688 | B2 | * | 1/2011 | Hauenstein et al. ........... 370/237 |
| 2001/0003833 | A1 | * | 6/2001 | Tomizawa et al. ............. 709/240 |
| 2002/0064166 | A1 | | 5/2002 | Suetsugu et al. |
| 2002/0064168 | A1 | * | 5/2002 | Garakani et al. .............. 370/410 |
| 2003/0142685 | A1 | * | 7/2003 | Bare .............................. 370/410 |
| 2004/0071468 | A1 | * | 4/2004 | Doh et al. ........................ 398/59 |
| 2006/0039278 | A1 | * | 2/2006 | Harby et al. .................. 370/225 |
| 2007/0165658 | A1 | * | 7/2007 | Mutoh .......................... 370/403 |
| 2008/0068988 | A1 | * | 3/2008 | Tochio .......................... 370/228 |

(Continued)

FOREIGN PATENT DOCUMENTS

| JP | 10-224389 | 8/1998 |
| JP | 2002-232442 | 8/2002 |
| JP | 2007-194957 | 8/2007 |
| JP | 2009-188673 | 8/2009 |

*Primary Examiner* — Asad Nawaz
*Assistant Examiner* — Syed S Ali
(74) *Attorney, Agent, or Firm* — Staas & Halsey LLP

(57) ABSTRACT

In a multi-ring communication network, first and second rings include first and second connection nodes, respectively, that are adjacently connected to each other. The first connection node receives, from adjacent nods, traffic information storing a pair of input and output node identifiers in association with each of storage areas included in a frame to be transmitted, where the input node identifier identifies an adjacent node from which data is inputted, and the output node identifier identifies an adjacent node to which the data is outputted. When the received traffic information includes the output node identifier identifying the second connection node, the first connection node sets a plurality of redundant path segments each including the second connection node, based on the received traffic information, where the plurality of redundant path segments includes a currently-used path segment.

3 Claims, 12 Drawing Sheets

(56) References Cited

U.S. PATENT DOCUMENTS

| | | | |
|---|---|---|---|
| 2008/0279198 A1* | 11/2008 | Gruber et al. | 370/400 |
| 2008/0316918 A1* | 12/2008 | Sakauchi | 370/223 |
| 2009/0052317 A1* | 2/2009 | Takagi et al. | 370/223 |
| 2009/0073874 A1* | 3/2009 | Maruyoshi et al. | 370/225 |
| 2009/0196202 A1 | 8/2009 | Fujii et al. | |
| 2009/0323521 A1* | 12/2009 | Tochio | 370/225 |
| 2010/0034204 A1* | 2/2010 | Sakauchi | 370/400 |
| 2011/0019678 A1* | 1/2011 | Mehta et al. | 370/401 |
| 2013/0177021 A1* | 7/2013 | Kitayama et al. | 370/392 |

* cited by examiner

FIG. 3

| PSI/TS | TYPE OF DATA | INPUT NODE ID | OUTPUT NODE ID |
|---|---|---|---|
| 1 | ODUkx | 16 | 21 |
| 2 | ODUky | 16 | 12 |
| 3 | ODUkx | 16 | 21 |
| ... | ... | ... | ... |

FIG. 4

| PSI/TS | REDUNDANT PATH SEGMENT A | REDUNDANT PATH SEGMENT B |
|---|---|---|
| 1 | 16-11-21 | 21-22-12 |
| 2 | – | – |
| 3 | 16-11-21 | 21-22-12 |
| ... | ... | ... |

SYSTEM AND METHOD FOR SETTING REDUNDANT PATH SEGMENTS IN A MULTI-RING COMMUNICATION NETWORK

CROSS-REFERENCE TO RELATED APPLICATION

This application is based upon and claims the benefit of priority of the prior Japanese Patent Application No. 2001-057286, filed on Mar. 15, 2011, the entire contents of which are incorporated herein by reference.

FIELD

The present invention relates to a system and method for setting redundant path segments in a multi-ring communication network.

BACKGROUND

In recent years, a transmission system that includes multiple rings has been designed to improve the efficiency of data transmission. Further, in order to construct a large-size network, implementation of a multi-ring configuration in a transmission system has been considered in which multiple rings are connected to each other. Hereinafter, a transmission system in which multiple rings are connected to each other will be also referred to as "a multi-ring transmission system", and a communication network including multiple rings will be also referred to as "a multi-ring communication network".

Implementation of a bi-directional line switched ring (BLSR) scheme has been proposed as a method for ensuring a redundancy of a multi-ring transmission system based on a synchronous digital hierarchy (SDH). In the BLSR scheme, for example, a data transmission node positioned along a ring in which a plurality of nodes are connected to each other in a ring topology sets a pair of redundant path segments including a working path and a protection path along the ring, and the data transmission node transmits data in one direction along the ring in a normal operational state through the working path along the ring. In the BLSR scheme, when a failure has occurred at the working path, an active redundant path segment for actually transmitting data is switched from the currently-used redundant path segment (the working path) to an alternative redundant path segment (the protection path), and the data is transmitted in the opposite direction along the ring through the alternative redundant path segment (the protection path).

Japanse Laid-open Patent Publications Nos. 2002-232442, 10-224389 and 2007-194957 are examples of the related art.

SUMMARY

According to an aspect of an embodiment, there is provided a system and method for setting redundant path segments in a multi-ring communication network. The system includes first and second plurality of nodes. The first plurality of nodes are communicably coupled to each other through a first ring arranged in the multi-ring network. The second plurality of nodes are communicably coupled to each other through a second ring arranged in the multi-ring network. The first plurality of nodes includes a first connection node that is adjacently connected to a second connection node included in the second plurality of nodes. The first connection node receives traffic information from adjacent nods including the second connection node and a pair of nodes that are located adjacent to the first connection node along the first ring. The traffic information stores a pair of input and output node identifiers in association with each of storage areas included in a frame to be transmitted in the multi-ring communication network. The input node identifier identifies an adjacent node from which data stored in the each of storage areas is inputted, and the output node identifier identifies an adjacent node to which the data stored in the each of storage areas is outputted. The first connection node sets a plurality of redundant path segments each including the second connection node, based on the received traffic information, when the received traffic information includes the output node identifier identifying the second connection node, where the plurality of redundant path segments include a currently-used path segment.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 3 is a diagram illustrating an example of traffic information, according to an embodiment;

FIG. 4 is a diagram illustrating an example of redundant path segment setting information, according to an embodiment;

DESCRIPTION OF EMBODIMENT

The conventional technique described above has a problem that the amount of information to be held by each of nodes forming a ring becomes larger in order to achieve the function of the BLSR scheme.

For example, in the conventional technique for setting redundant path segments in a multi-ring network, each node included in a first ring is required to hold not only information on the first ring including the each node but also information on the configuration of a second ring connected to the first ring including the each node, in order to set redundant path segments that connect the each node to another node included in the second ring. Especially, since a large number of paths concentrate on a connection node that is adjacently connected to another node included in the second ring, the connection node has a tendency to hold a large amount of information on the configurations on multiple rings. As mentioned above, in the conventional technique, the amount of information to be held by each of nodes that form the multiple rings may become excessively larger.

Embodiments of a system, a method, and an apparatus for setting redundant path segments will be described below in detail with reference to the accompanying drawings. However, the embodiments described below are not limited to the techniques disclosed herein.

Figure 1:
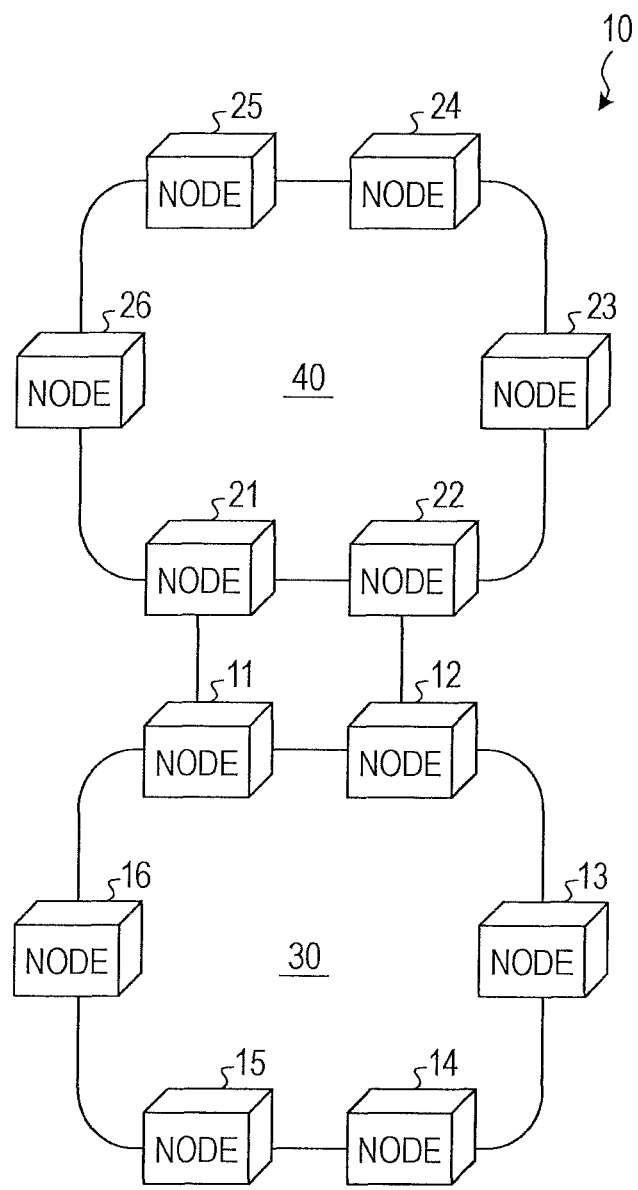
FIG. 1 is a diagram illustrating a configuration example of a multi-ring transmission system, according to an embodiment.

FIG. 1 is a diagram illustrating a configuration example of a multi-ring transmission system, according to an embodiment. As illustrated in FIG. 1, for example, multi-ring transmission system 10 according to the embodiment may be configured to include a first plurality of nodes 11 to 16 and a second plurality of nodes 21 to 26. The first plurality of nodes 11 to 16 are communicably coupled to each other through optical fibers arranged in a ring topology, and form a first ring 30. The second plurality of nodes 21 to 26 are communicably coupled to each other through optical fibers arranged in a ring topology, and form a second ring 40.

In the example of FIG. 1, the first ring 30 and the second ring 40 are connected to each other via a link connecting the node 11 to the node 21 and via a link connecting the nodes 21 to the node 22. Here, for example, bi-directional line switched ring (BLSR) architecture based on a synchronous digital hierarchy (SDH) transmission protocol may be implemented in each of the rings 30 and 40. In this case, two or four optical fibers may be arranged in each of the links that connect the rings 30 and 40. Further, the first ring 30 may be connected to one or more rings other than the second ring 40 (not depicted in FIG. 1).

In the example of FIG. 1, each of the nodes 11, 12, 21, 22 is referred to as "a connection node" that is adjacently connected to another ring other than the ring including the each node. For example, the node 11 that is included in the first ring 30 is a connection node that is adjacently connected to a node 21 included in the second ring 40 that is different from the first ring 30 including the nodes 11 to 16. The node 12 included in the first ring 30 is also a connection node that is adjacently connected to a node 22 included in the second ring 40 different from the first ring 30 including the nodes 11 to 16. Similarly, the node 21 included in the second ring 40 is also a connection node that is adjacently connected to the node 11 included in the first ring 30 different from the second ring 40 including the nodes 21 to 26. Similarly, the node 22 included in the ring 40 is also a connection node that is adjacently connected to the node 12 included in the first ring 30 different from the second ring 40 including the nodes 21 to 26.

Figure 2:
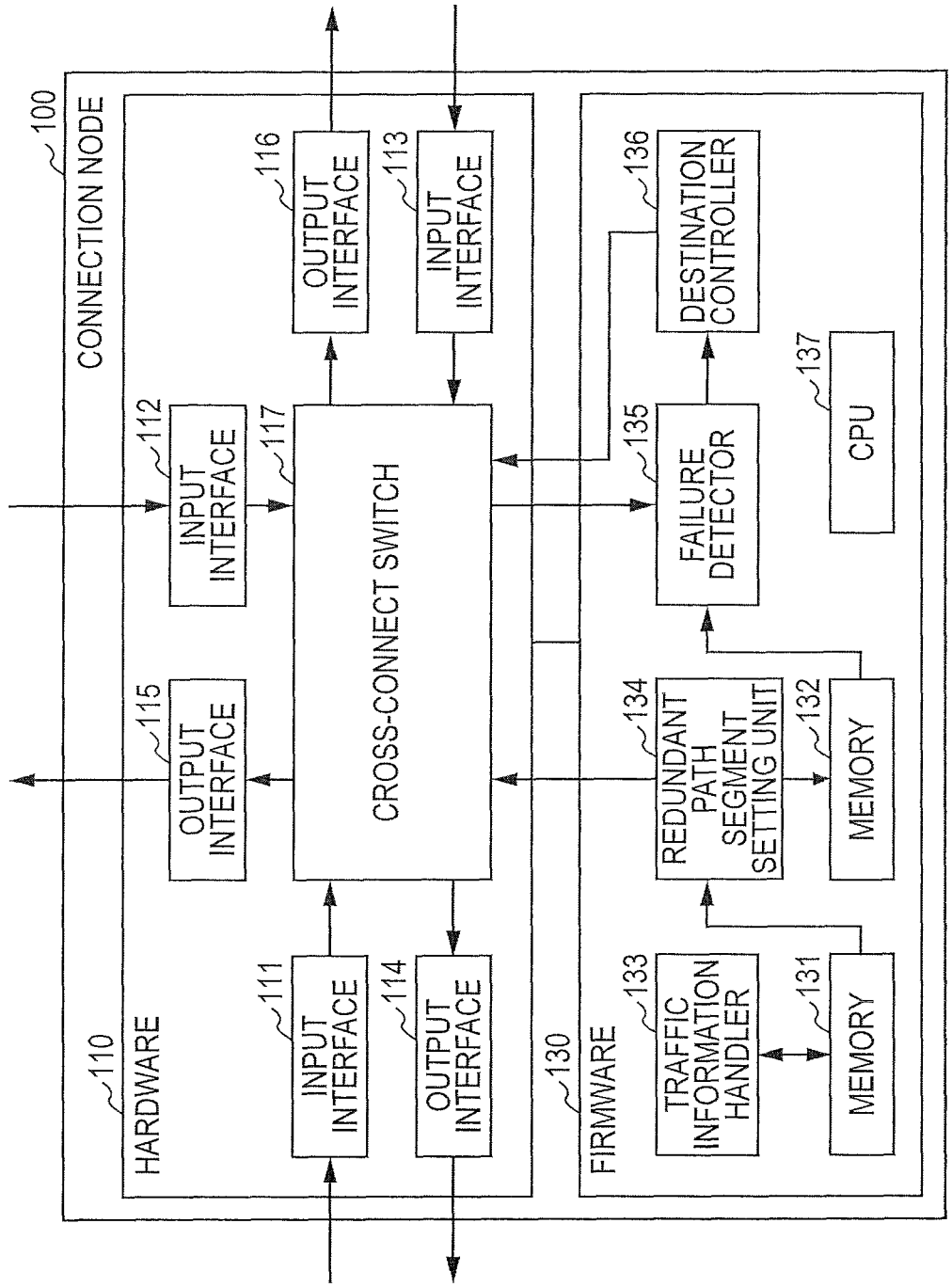
FIG. 2 is a diagram illustrating a configuration example of a connection node, according to an embodiment.

FIG. 2 is a diagram illustrating a configuration example of a connection node, according to an embodiment. Like the connection nodes 11, 12, 21, 22 illustrated in FIG. 1, the connection node 100 is one of a plurality of nodes constituting a ring, and adjacently connected to a node included in another ring that is different from the ring including the connection node 100. Hereinafter, for convenience of explanation, it is assumed that a connection node 100 is included in the first ring 30 depicted in FIG. 1, and another ring is the second ring 40 depicted in FIG. 1. Further, it is also assumed that the connection node 100 is the node 11 illustrated in FIG. 1. Hereinafter, a connection node 11 included in the first ring 30 will be also referred to as "a first connection node" and a connection node 21 that is included in the second ring 40 and adjacently connected to the first connection node 11 will be also referred to as "a second connection node". As an example of a frame to be transmitted in a multi-ring communication network, an optical channel transport unit (OTU) frame standardized by ITU-T Recommendation G.709 will be used in the following description.

As illustrated in FIG. 2, a connection node 100 (a first connection node) may be configured to include hardware 110 and firmware 130. For example, the hardware 110 may be configured to include input interfaces 111, 112, 113, output interfaces 114, 115, 116, and a cross-connect switch 117.

The input interfaces 111, 112, 113 each receive a frame to be transmitted, from an adjacent node, and send the frame to the cross-connect switch 117. For example, the input interface 112 of the first connection node 100 receives a frame from the second connection node 21 that is included in the second ring 40 and is adjacently connected to the first connection node 100. Then, the input interface 112 extracts data from each of storage areas included in the received frame, and sends the extracted data to the cross-connect switch 117. Further, for example, the input interfaces 111 and 113 each receive a frame from an adjacent node that is located adjacent to the first connection node 100 along the first ring 30, extract data from each of storage areas included in the received frame, and send the extracted data to the cross-connect switch 117.

The output interfaces 114, 115, 116 each output a frame (to be transmitted) to outside the first connection node 100. For example, the output interfaces 114, 115, 116 each receive data from the cross-connect switch 117, multiplex the received data into the corresponding storage areas of a frame to be transmitted, and transmit the multiplexed frame to one of adjacent nodes, that is, one of the nodes 21, 12, 16.

The cross-connect switch 117 switches, for each of storage areas included in a frame, an output destination of data stored in the each storage area, based on traffic information stored in a memory 131 (which will be described later). Here, the cross-connect switch 117 may be configured to switch an output destination of data stored in each of the storage areas of the frame under control of a destination controller 136 which will be described later.

The firmware 130 may be configured to include memories 131, 132, a traffic information handler 133, a redundant path segment setting unit 134, a failure detector 135, a destination controller 136, and a CPU 137. The CPU 137 is a control circuit that controls operations of the entire firmware 130.

The memory 131 stores traffic information indicating traffic flows regarding the first and second connection nodes. For example, the traffic information stores a pair of input and output node identifiers in association with each of storage areas included in a frame that is to be transmitted in the multi-ring communication network. Here, the input node identifier identifies an adjacent node from which data stored in the each of storage areas is inputted, and the output node identifier identifies an adjacent node to which the data stored in the each of storage areas is outputted.

FIG. 3 is a diagram illustrating an example of traffic information, according to an embodiment. As illustrated in FIG. 3, the memory 131 stores traffic information that may be configured to store, for each of storage areas of a frame to be transmitted, an entry including a payload structure identifier/tributary slot (abbreviated as "PSI/TS" in FIG. 3), the type of data, an input node identifier (abbreviated as "input node ID" in FIG. 3), and an output node identifier (abbreviated as "output node ID" in FIG. 3).

The PSI/TS of FIG. 3 identifies each of data storage areas included in an OTU frame to be transmitted. The type of data indicates the type of data stored in a storage area identified by the PSI/TS. The input node identifier identifies an adjacent node from which the data is inputted to the connection node 100. The output node identifier identifies adjacent node to which the data is outputted from the connection node 100.

In FIG. 3, the first entry of the traffic information indicates that data that is typed as "ODUkx" and stored in a storage area of the OTU frame identified by PSI/TS "1" is inputted from the node identified by "16", that is, the node 11 in FIG. 1 (located adjacent to the connection node 100 along the first ring) to the first connection node 100, and is outputted from the first connection node 100 to the node identified by "21", that is, the second connection node 21 of the second ring 40 as depicted in FIG. 1. Hereinafter, for convenience of explanation, for example, the node identified by "16" will be also expresses as "the node 16". The second entry of the traffic information indicates that data that is typed as "ODUky" and stored in a storage area of the OUT frame identified by PSI/TS "2" is inputted from the node 16 (located adjacent to the first connection node 100 along the first ring 30) to the first connection node 100, and is outputted from the first connection node 100 to the node 12 located adjacent to the first connection node 100 along the first ring 30. In this way, for example, the cross-connect switch 117 determines, for each of the storage areas of the OTU frame, one of adjacent nodes to which data stored in the each storage area is to be outputted from the first connection node 100, by referring to the traffic information stored in the memory 131.

FIG. 4 is a diagram illustrating an example of redundant path segment setting information, according to an embodiment. For example, the redundant path segment setting information may be configured to be set by the redundant path segment setting unit 134 and stored in the memory 132. For example, when the number of redundant path sections is 2, the redundant path segment setting information may be configured to include entries each storing a pair of redundant path segment identifiers A and B in association with a PSI/TS. For example, the redundant path segment identifiers A and B may identify a pair of a working path and a protection path, respectively, where the working path is used for transmitting data in a normal operating state and the protection path is used, instead of the working path, for transmitting data when a failure has occurred in the working path.

The PSI/TS identifies one of the storage areas of the OTU frame where the storage area is used for storing data to be transmitted through redundant path segments. In FIG. 4, for example, the redundant path segment identifier A identifies a primary path segment that is used for transmitting data stored in the storage area identified by the PSI/TS in a normal operating state. The redundant path segment identifier B identifies a secondary path segment that is provided as an alternative to the primary path segment.

The first entry of the redundant path segment setting information 132 of FIG. 4 indicates that a pair of redundant path segments for connecting first and second rings are set for an OTU-frame storage area identified by the PSI/TS "1" so that data stored in the OTU-frame storage area identified by the PSI/TS "1" is securely transmit between the first and second connection nodes 11 and 21. That is, as a pair of redundant path segments, a primary path segment including the nodes 16, 11, 21 and a secondary path segment including the nodes 21, 22, 12 are set for the OTU-frame storage area identified by the PSI/TS "1".

The second entry of the redundant path segment setting information 132 indicates that redundant path segments are not required since data stored in an OTU-frame storage area identified by the PSI/TS "2" is transmitted only within the first ring including the connection node 100.

The third entry of the redundant path segment setting information 132 indicates that a pair of redundant path segments for connecting first and second rings are set for an OTU-frame storage area identified by the PSI/TS "3" so that data stored in the OTU-frame storage area identified by the PSI/TS "3" is securely transmit between the first and second connection nodes 11 and 21. That is, as a pair of redundant path segments, a primary path segment including the nodes 16, 11, 21 and a secondary path segment including the nodes 21, 22, 12 are set for the OTU-frame storage area identified by the PSI/TS "3".

Entries of the traffic information and the redundant path segment setting information may be inputted by a manual operation of an administrator or by a network management system (NMS).

The traffic information handler 133 of FIG. 2 performs transmission of the traffic information stored in the memory 131 between the connection node 100 and adjacent nodes that include a second connection node in the second ring and a pair of nodes located adjacent to the connection node 100 along the first ring. For example, the traffic information handler 133 receives the traffic information via at least one of the input interfaces 111, 112, 113 from the adjacent nodes, and stores the received traffic information in the memory 131. Further, the traffic information handler 133 transmits the traffic information stored in the memory 131 via at least one of the output interfaces 114, 115, 116 to the adjacent nodes. This allows the adjacent nodes of the connection node 100 to identify a frame storage area that is currently being used for inputting and outputting data between the connection node 100 and the adjacent nodes.

When the traffic information stored in the memory 131 includes, as an output node identifier for a frame storage area, information identifying a second connection node that is included in the second ring and adjacent to the connection node 100, the redundant path segment setting unit 134 sets, for the frame storage area, a plurality of redundant path segments each including the second connection node at the cross-connect switch 117, and stores, in the memory 132, information on the plurality of redundant path segments for the frame storage area. Here, the plurality of redundant path segments includes a currently-used path segment. On the other hand, when traffic information that has been received and stored in the memory 131 does not include any entries storing an output node identifier identifying the second connection node, the traffic information indicates that data stored in the frame storage area is to be protected by a normal ring protection method used for a BLSR. In this case, the redundant path segment setting unit 134 does not set a plurality of redundant path segments for the frame storage area.

An example of a process performed by the redundant path segment setting unit 134 is described below. For example, the redundant path segment setting unit 134 determines whether or not the traffic information stored in the memory 131 includes an entry storing an output node identifier identifying a second connection node in the second ring. In the example illustrated in FIG. 3, the traffic information stored in the memory 131 includes an entry identifying the node 21 as an output node for an OTU-frame storage area (having a data type of "ODUkx") identified by the PSI/TS "1", where the node 21 is a second connection node in the second ring 40. In this case, the redundant path segment setting unit 134 sets, at the cross-connect switch 117, a pair of redundant path segments (each including the second connection node 21): a first redundant path segment including the nodes 16, 11, 21 and a second redundant path segment including the nodes 21, 22, 12. And then the redundant path segment setting unit 134 stores, in the memory 132, information on the pair of redundant path segments.

On the other hand, the traffic information stored in the memory 131 includes an entry identifying the node 12 as an output node for a storage area of the OTU frame (having a data type of "ODUky") identified by the PSI/TS "2", where the node 12 is a node located adjacent to the connection node 100 along the first ring. This means that data stored in the OTU-frame storage area identified by the PSI/TS "2" is transferred within the first ring including the connection node 100 and protected by a normal ring protection method used for a BLSR. In this case, the redundant path segment setting unit 134 does not set a plurality of redundant path segments at the cross-connect switch 117, and stores information indicating that redundant path segments are not being set for the OTU-frame storage area, into the memory 132, as denoted by a sign "–" in FIG. 4.

In this way, when the connection node 100 receives, from adjacent nodes, traffic information that includes an entry storing output node identifier identifying the second connection node, the connection node 100 sets a plurality of redundant path segments each including the second connection node. This allows the first connection node (connection node 100) to establish a plurality of redundant path segments for connecting the first and second connection nodes 11 and 21, based on the received traffic information, without using configuration information of the second ring. Therefore, the first connection node (connection node 100) does not need to store the configuration information of the second ring, reducing the amount of information to be held by the connection nodes.

Returning to FIG. 2, the failure detector 135 detects a failure that has occurred in at least one of the plurality of redundant path segments set by the redundant path segment setting unit 134. For example, the failure detector 135 detects a failure occurrence in at least one of the plurality of redundant path segments, by monitoring the plurality of redundant path segments for each of the storage areas included in a frame to be transmitted, based on the redundant path segment setting information stored in the memory 132.

The destination controller 136 switches an output node to which data stored in each storage area is to be outputted, by controlling the cross-connect switch 117 based on the result of failure detection received from the failure detector 135. When the failure detector 135 detects a failure occurrence at one of the plurality of redundant path segments, the destination controller 136 controls a transmission of the corresponding data by bypassing the faulty portion within the first ring, and switches an active redundant route segment for actually transmitting data from the currently-used one of the plurality of redundant path segments to an alternative one of the plurality of redundant path segments. The process of controlling the transmission path of data by bypassing the faulty portion within the first ring may be performed in accordance with the ring protection rule for a BLSR.

An example of the process performed by the destination controller 136 is described below. When the failure detector 135 detects a failure occurrence at the node "11" included in redundant path segment A of "16-11-21" (as depicted in FIG. 4) including the nodes 16, 11, 21, the destination controller 136 controls a transmission of data stored in the OTU-frame storage area identified by the PSI/TS "1" by bypassing the node 11 within the first ring. At the same time, the destination controller 136 switches an active redundant path segment for actually transmitting data stored in the OTU-frame storage area identified by the PSI/TS "1", from redundant path segment A of "16-11-21" to redundant path segment B of "21-22-12" (as depicted in FIG. 4).

When a failure has occurred within the first ring including the connection node 100, the destination controller 136 controls a transmission of data stored in the OTU-frame storage area by bypassing the faulty portion within the first ring based on the ring protection rule of a BLSR.

Figure 5:
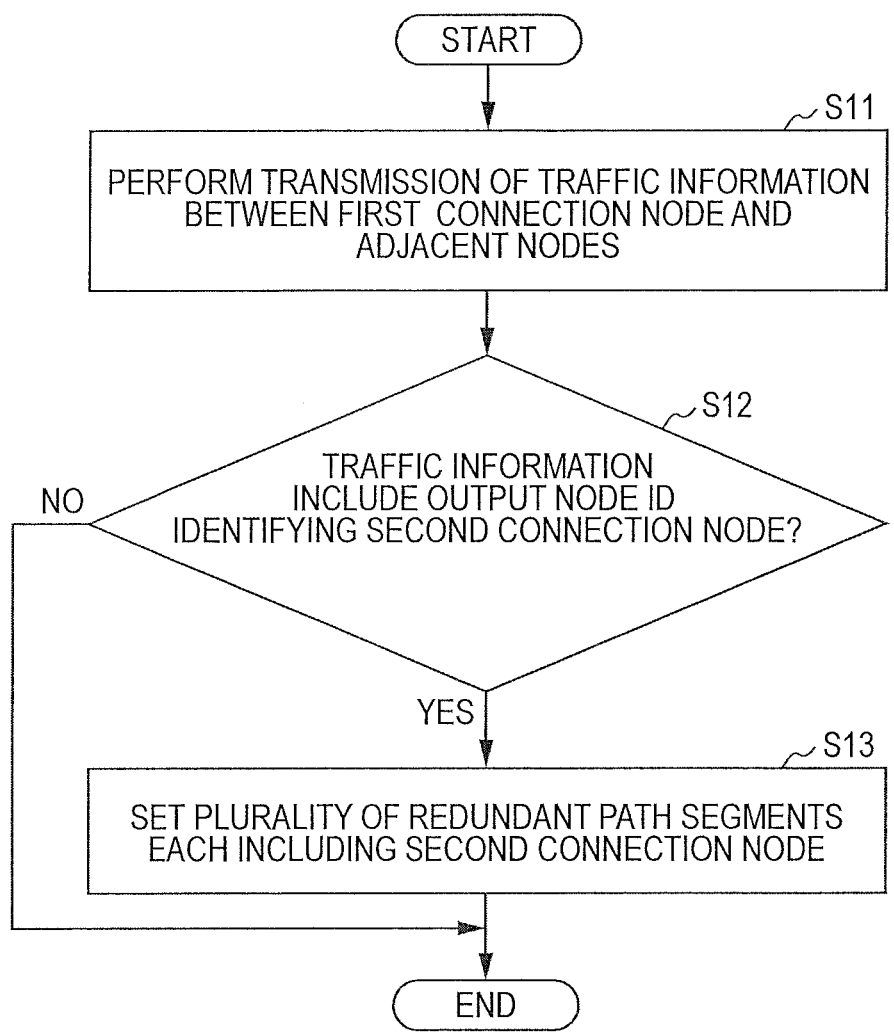
FIG. 5 is a diagram illustrating an example of an operational flowchart of a connection node for setting a plurality of redundant path segments, according to an embodiment.

FIG. 5 is a diagram illustrating an example of an operational flowchart of a connection node for setting a plurality of redundant path segments, according to an embodiment. A connection node 100 according to the embodiment performs redundant path segment setting process every time the connection node 100 transmits or receives traffic information.

In operation S11, the traffic information handler 133 of connection node 100 performs transmission of traffic information between the connection node 100 and adjacent nodes where the adjacent nodes include the second connection node included in the second ring and a pair of adjacent nodes that are located adjacent to the connection node 100 along the first ring. Here, the traffic information handler 133 stores the received traffic information in memory 131.

In operation S12, the redundant path segment setting unit 134 of the connection node 100 determines whether or not the traffic information received and stored in the memory 131 includes an output node identifier identifying the second connection node included in the second ring, that is, includes an entry storing an output node identifier identifying the second connection node. When the traffic information does not include an output node identifier identifying the second connection node included in the second ring (No in operation S12), the redundant path segment setting unit 134 does not set a plurality of redundant path segments. On the other hand, when the traffic information includes an output node identifier identifying the second connection node included in the second ring (Yes in operation S12), the redundant path segment setting unit 134 sets a plurality of redundant path segments each including the second connection node.

Figure 6:
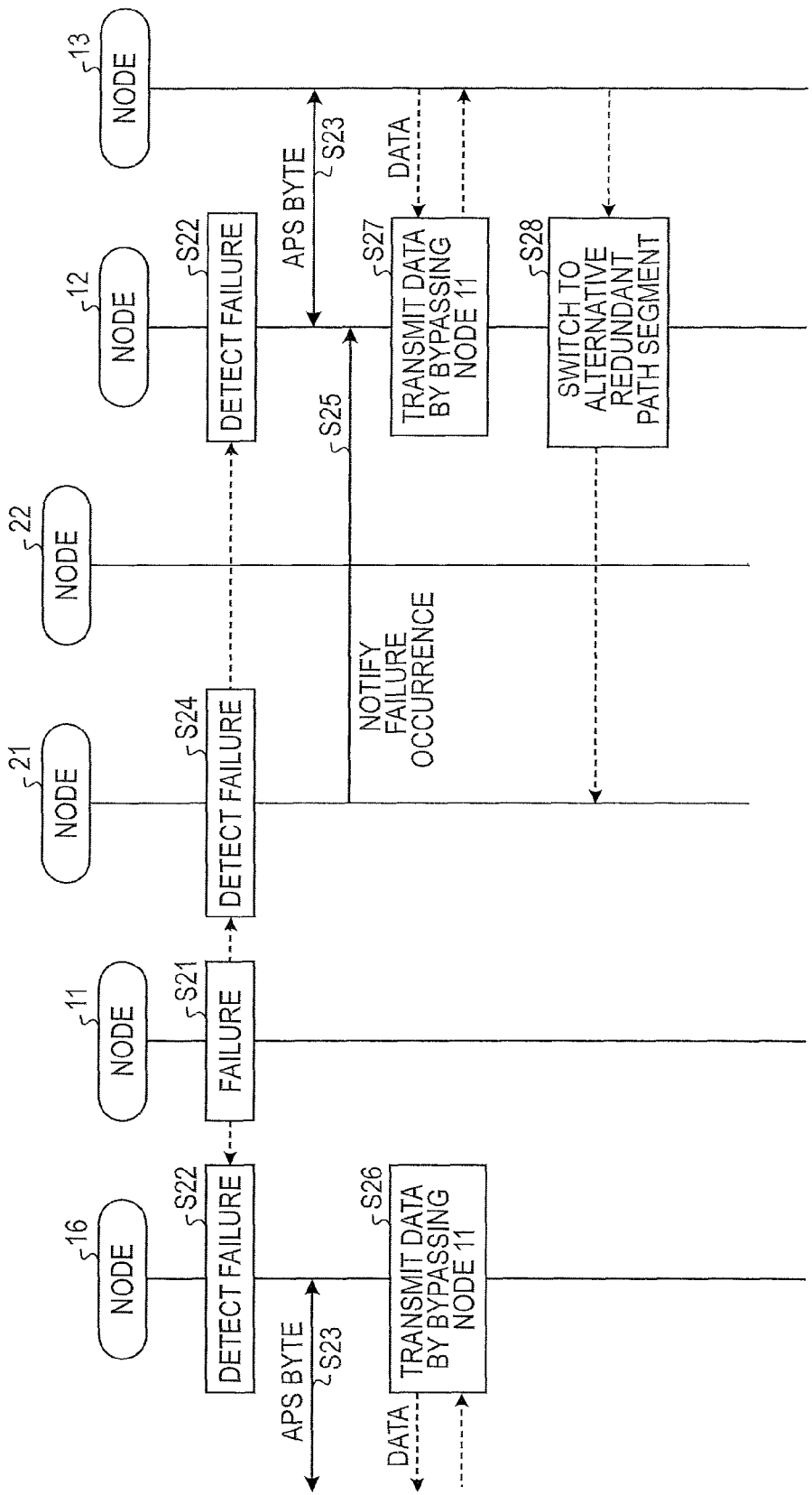
FIG. 6 is a diagram illustrating an example of an operational sequence for transmitting data by bypassing a faulty connection node, according to an embodiment.

FIG. 6 is a diagram illustrating an example of an operational sequence for transmitting data by bypassing a faulty connection node, according to an embodiment.

In operation S21, a failure has occurred at the first connection node 11 along the first ring 30 in the multi-ring transmission system 10 of FIG. 1.

In operation S22, the adjacent nodes 12, 16 that are located adjacent to the first connection node 11 detect the failure occurrence of the first connection node 11.

In operation S23, in response to the failure detection, the adjacent nodes 12 and 16 each insert an automatic protection switching (APS) byte in a frame to be transmitted/and output the frame to the first ring 30, where the APS byte requests nodes located along the first ring 30 to switch an active path for actually transmitting data from the currently-used working path to an alternative protection path so as to bypass the faulty node 11 at which the failure such as a signal failure (SF) has occurred.

In operation S24, the second connection node 21 along the second ring 40 detects the failure occurrence at the first connection node 11 by monitoring the redundant path segment "16-11-21" including the nodes 16, 11, 21.

In operation S25, in response to the detection of the failure occurrence at the node 11, the second connection node 21 notifies the node 12 that the failure has occurred at the first connection node 11, using the redundant path segment "21-22-12" including the nodes 21, 22, 12.

In operation S26, the node 16, upon receiving the APS byte, transmits data stored in the corresponding storage area along the ring 30 by bypassing the node 11 at which the failure has occurred, based on the ring protection rule of a BLSR.

In operation S27, the node 12, upon receiving both the APS byte and the notification indicating that the failure has occurred at the node 11, transmits data stored in the corresponding storage area along the ring 30, by bypassing the node 11 at which the failure has occurred, based on the ring protection rule of a BLSR.

At the same time, in operation S28, the node 12 switches an active redundant path segment for actually transmitting data, from the currently-used redundant path segment "16-11-21" including the nodes 16, 11, 21 to an alternative redundant path segment "21-22-12" including the nodes 21, 22, 12.

Next, description will be given of a data flow regarding operations S21 to S28 of FIG. 6, with reference to FIGS. 7 and 8.

Figure 7:
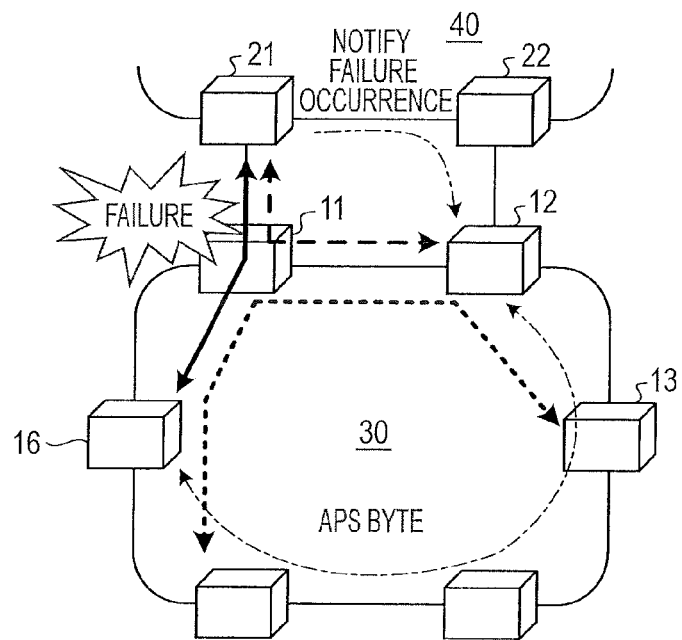
FIG. 7 is a schematic diagram illustrating an example of a data flow when a failure has occurred at a connection node, according to an embodiment.
Figure 8:
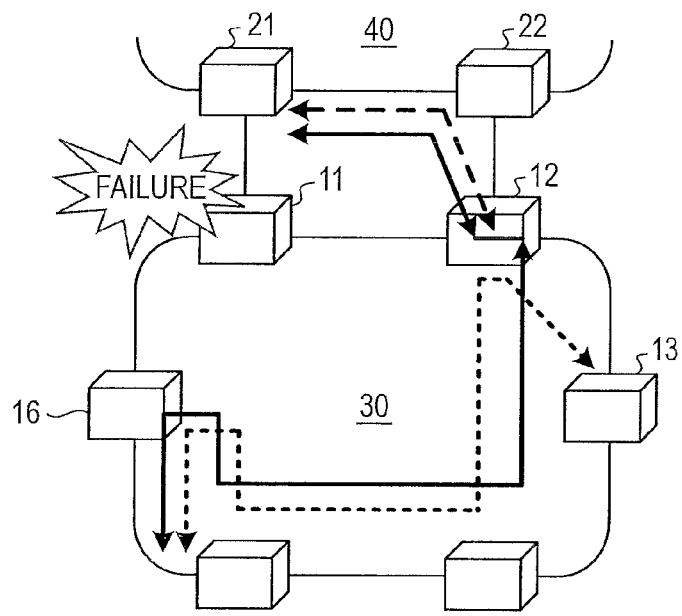
FIG. 8 is a schematic diagram illustrating an example of a data flow when a failure has occurred at a connection node, according to an embodiment.

FIGS. 7 and 8 are diagrams each illustrating an example of a data flow when a failure has occurred at a first connection node, according to an embodiment. In FIG. 7, when a failure has occurred at the first connection node 11, adjacent nodes 12 and 16 detect the failure occurrence of the first connection node 11. Then, the adjacent nodes 12 and 16 each insert an APS byte into a frame to be transmitted, and output the frame to the first ring 30. On the other hand, the second connection node 21 included in the second ring 40 detects the failure occurrence of the node 11 by monitoring the redundant path segment "16-11-21" including the nodes 16, 11, 21. The second connection node 21, in response to the detection of the failure occurrence of the node 11, notifies the node 12 of the failure occurrence of the node 11, using the redundant path segment "21-22-12" including the nodes 21, 22, 12.

In FIG. 8, the adjacent node 16, upon receiving the APS byte, transmits the corresponding data along the ring 30 by bypassing the first connection node 11 at which the failure has occurred, based on the ring protection rule of a BLSR. For example, the node 16 transmits the corresponding data, which is to be transmitted from the node 16 through the node 11 to the node 12 along the first ring 30 in a normal operating state, from the node 16 through the node 13 to the node 12 along the first ring 30 by bypassing the node 11 at which the failure has occurred, based on the ring protection rule of a BLSR.

When the node 12 receives both the APS byte and the notification indicating that the failure has occurred at the node 11, the node 12 transmits the corresponding data along the first ring 30 by bypassing the faulty node 11 based on the ring protection rule of a BLSR. At the same time, the node 12 switches an active redundant path segment for actually transmitting data, from the currently-used redundant path segment "16-11-21" including the nodes 16, 11, 21, to an alternative redundant path segment "21-22-12" including the nodes 21, 22, 12. For example, the node 12 outputs the corresponding data, which is to be transferred from the node 16 through the first connection node 11 to the node 21 using the redundant path segment "16-11-21" in a normal operating state, to the alternative redundant path segment "21-22-12" including the nodes 21, 22, 12 after the corresponding data has been transferred from the node 16 through the node 13 to the node 12 along the first ring 30 by bypassing the faulty node 11.

Figure 9:
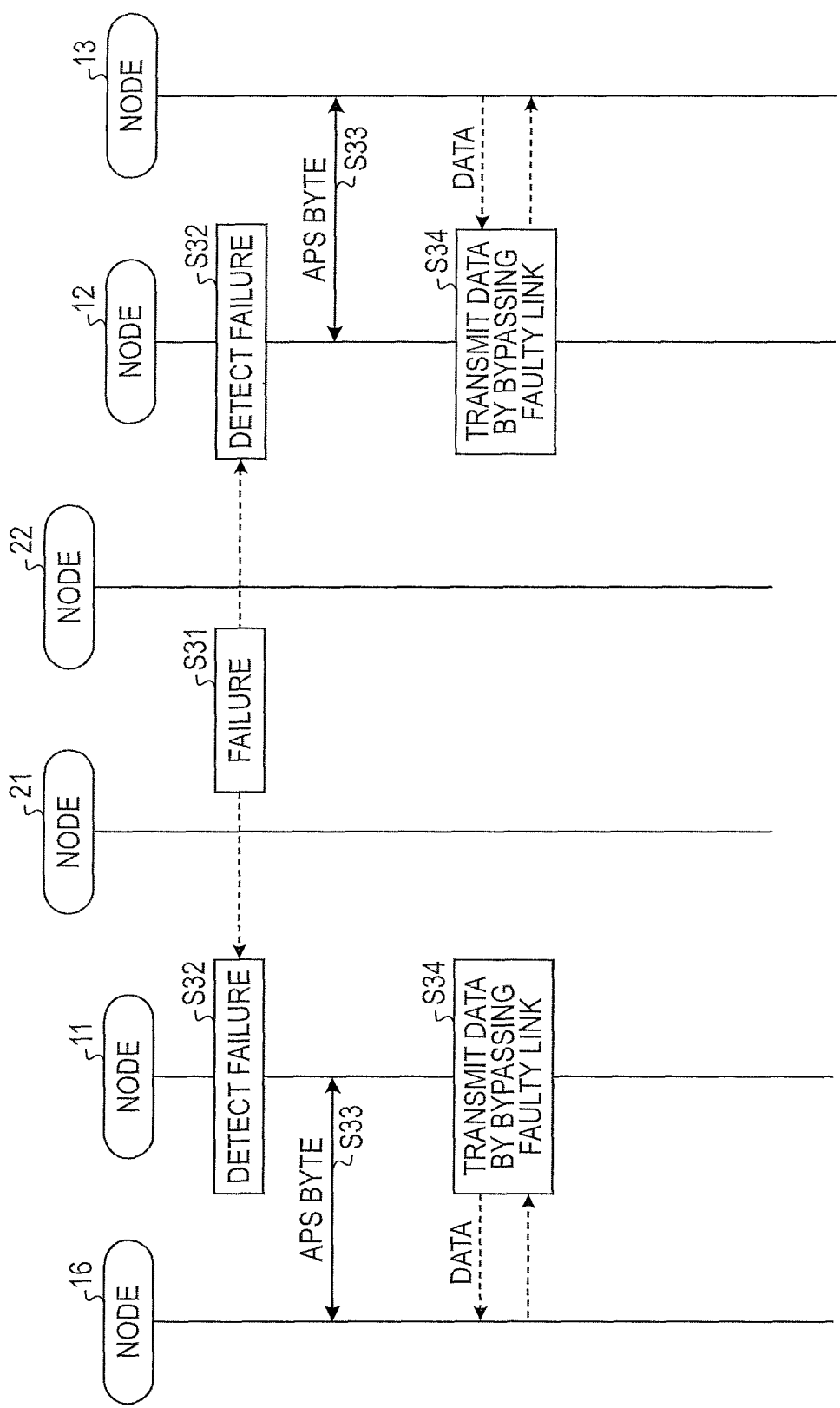
FIG. 9 is a diagram illustrating an example of an operational sequence for transmitting data by bypassing a faulty communication link, according to an embodiment.

FIG. 9 is a diagram illustrating an example of an operational sequence for transmitting data by bypassing a faulty link, according to an embodiment. In FIG. 9, it is assumed that a failure has occurred at the link connecting the first connection node 11 and the adjacent connection node 12 along the first ring 30.

In operation S31, a failure such as a signal failure (SF) has occurred at the link connecting the first connection node 11 and the adjacent node 12 along the first ring 30.

In operation S32, a pair of the nodes 11 and 12 each detect the failure occurrence at the link connecting the nodes 11 and 12.

In operation S33, in response to the failure detection, the nodes 11 and 12 each insert an APS byte into a frame to be transmitted, and output the frame to the ring 30, where the APS byte requests nodes along the first ring 30 to switch an active path for actually transmitting data from the currently-used working path to the alternative protection path.

In operation S34, upon receiving the APS byte, the nodes 11 and 12 each transmit the corresponding data along the first ring 30 by bypassing the faulty link connecting nodes 11 and 12, based on the ring protection rule of a BLSR.

Next, description will be given of a data flow regarding operations S31 to S34 of FIG. 9, with reference to FIGS. 10 and 11.

Figure 10:
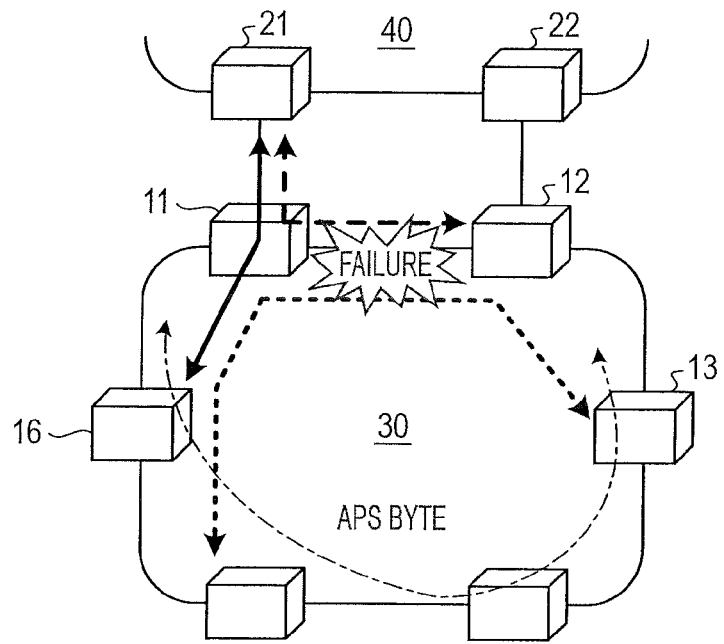
FIG. 10 is a schematic diagram illustrating an example of a data flow when a failure has occurred at a link connecting a pair of connection nodes, according to an embodiment.
Figure 11:
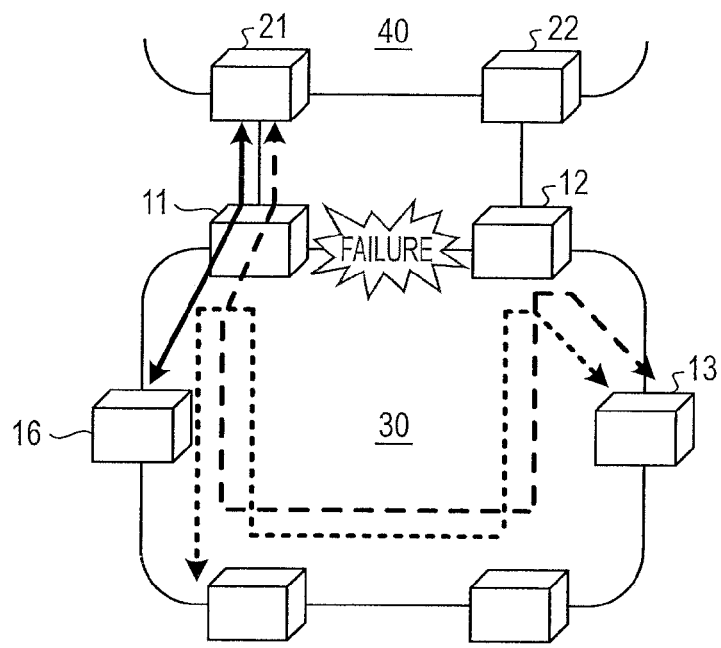
FIG. 11 is a schematic diagram illustrating an example of a data flow when a failure has occurred at a link connecting a pair of connection nodes, according to an embodiment.

FIGS. 10 and 11 are schematic diagrams each illustrating an example of a data flow when a failure has occurred at a link connecting a pair of connection nodes along a first ring, according to an embodiment. In FIG. 10, when a failure has occurred at a link connecting the first connection node 11 and the adjacent connection node 12 along the first ring 30, the nodes 11 and 12 each detect the failure occurrence of the link connecting the nodes 11 and 12. Then, the nodes 11 and 12 each insert the APS byte into a frame to be transmitted, and output the frame to the first ring 30.

In FIG. 11, upon receiving the APS byte, the nodes 11 and 12 each transmit the corresponding data along the ring 30 by bypassing the faulty link connecting the nodes 11 and 12, based on the ring protection rule of a BLSR. For example, the node 16 transmits the corresponding data, which is to be transmitted from the node 16 through the node 11 to the node 12 along the first ring 30 in a normal operating state, from the node 16 through the node 13 to the node 12 along the ring 30 by bypassing the faulty link connecting nodes 11 and 12, based on the ring protection rule of a BLSR.

Figure 12:
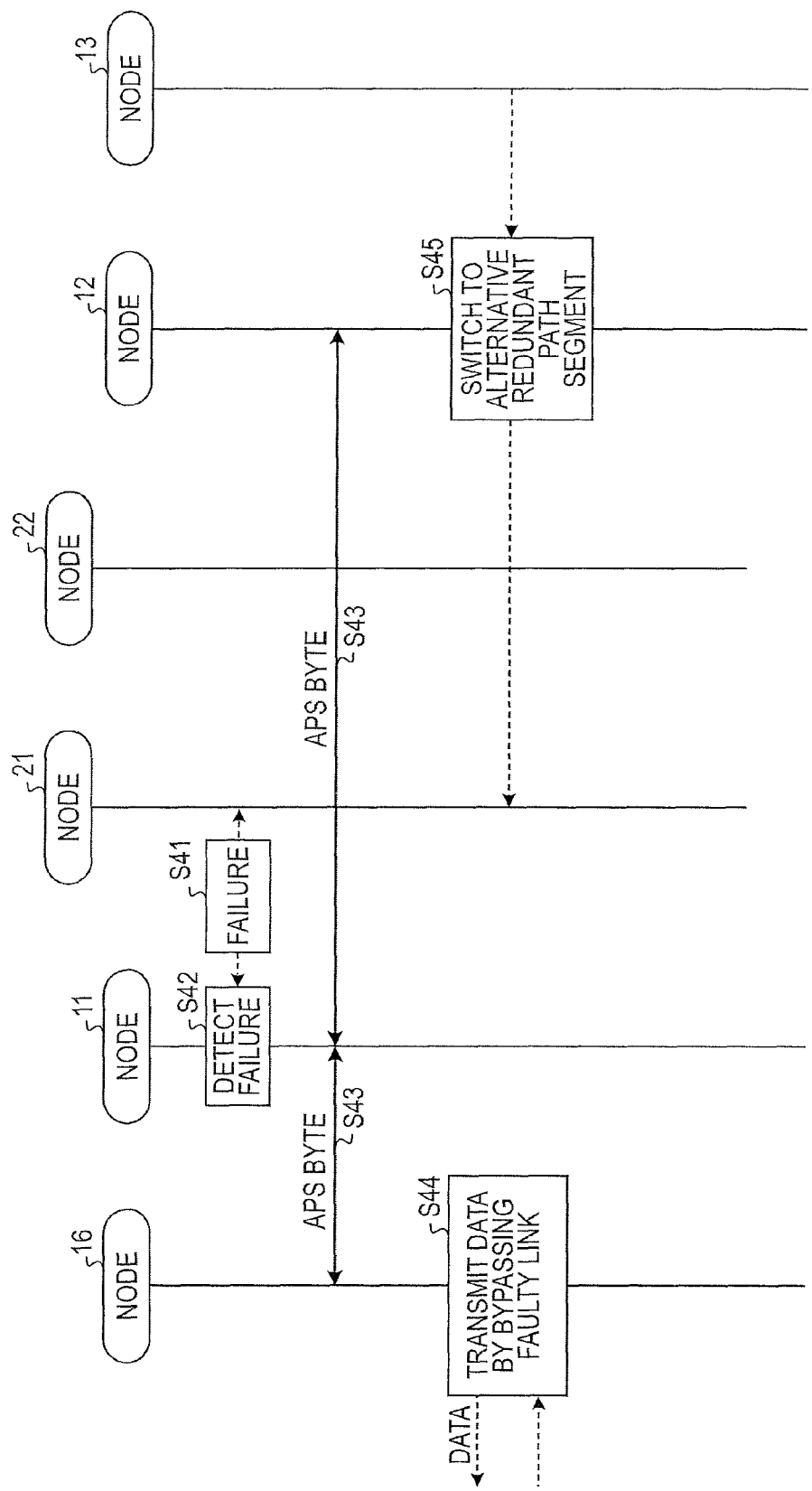
FIG. 12 is a diagram illustrating an example of an operational sequence for transmitting data by bypassing a faulty link, according to an embodiment.

FIG. 12 is a diagram illustrating an example of an operational sequence for transmitting data by bypassing a faulty link, according to an embodiment. In FIG. 12, it is assumed that a failure has occurred at a link connecting the first connection nodes 11 of the first ring 30 and the second connection node 21 of the second ring 40.

In operation S41, a failure has occurred at the link connecting the first connection node 11 along the first ring 30 and the second connection node 21 along the second ring 40.

In operation S42, the first connection node 11 detects the failure occurrence of the link connecting the nodes 11 and 21.

In operation S43, upon detecting the failure occurrence of the link connecting the nodes 11 and 21, the first connection node 11 inserts an APS byte into a frame to be transmitted, and outputs the frame to the first ring 30, where the APS byte requests nodes along the first ring 30 to switch an active path for actually transmitting data.

In operation S44, upon receiving the APS byte, the node 16 transmits the corresponding data along the first ring 30 by bypassing the faulty link connecting the nodes 11 and 12 based on the ring protection rule of a BLSR. In this case, the node 16 transmits, along the first ring 30 by bypassing the faulty link, only the data that is to be transmitted from the node 16 through the node 11 to the node 21 along the first ring 30 in a normal operating state.

In operation S45, upon receiving the APS byte, the node 12 switches an active redundant path segment for actually transmitting data, from the currently-used redundant path segment "16-11-21" including the nodes 16, 11, 21 to the alternative redundant path segment "21-22-12" including the nodes 21, 22, 12.

Next, description will be given of a data flow regarding operations S41 to S45 of FIG. 12, with reference to FIGS. 13 and 14.

Figure 13:
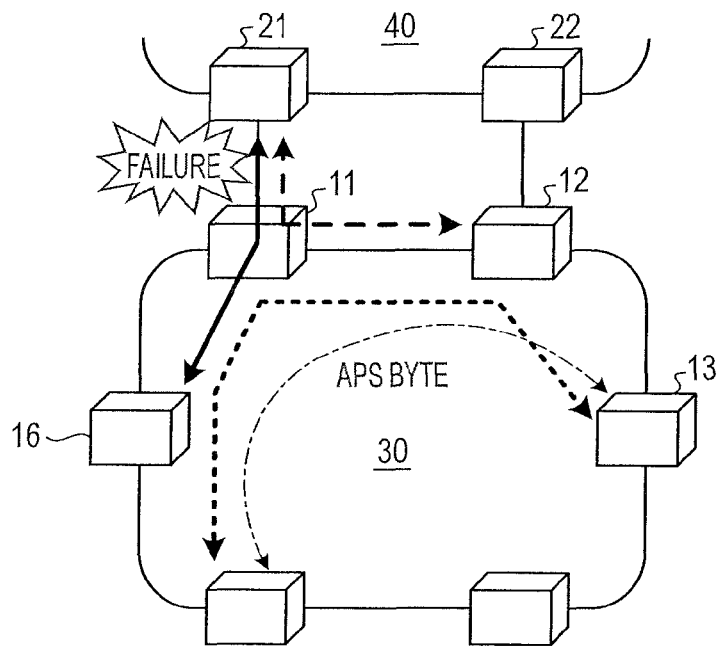
FIG. 13 is a schematic diagram illustrating an example of a data flow when a failure has occurred at a link connecting first and second connection nodes, according to an embodiment.
Figure 14:
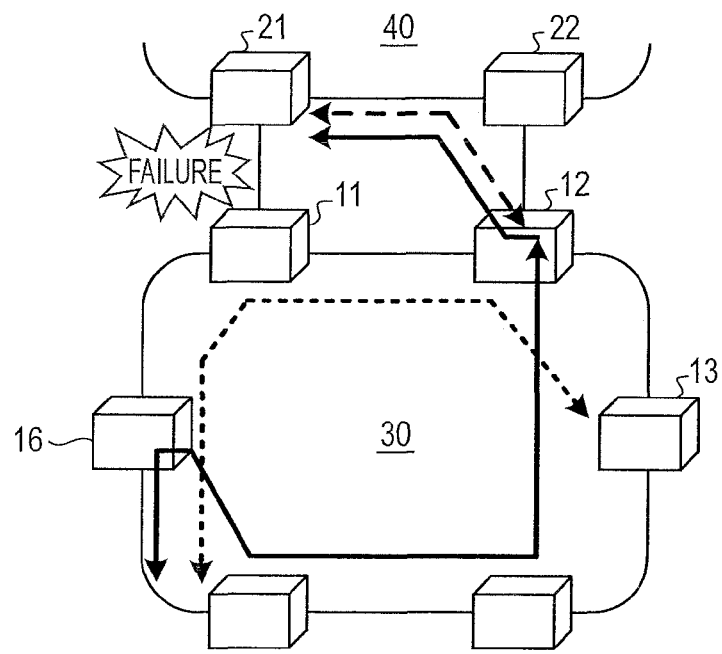
FIG. 14 is a schematic diagram illustrating an example of a data flow when a failure has occurred at a link connecting first and second connection nodes, according to an embodiment.

FIGS. 13 and 14 are schematic diagrams each illustrating an example of a data flow when a failure has occurred at a link connecting first and second connection nodes, according to an embodiment. In FIG. 13, when a failure has occurred at a link connecting the first connection node 11 and the second connection node 21, the first connection node 11 detects the failure occurrence of the link connecting the nodes 11 and 21. Then, the first connection node 11 inserts an APS byte into a frame to be transmitted, and outputs the frame to the first ring 30.

In FIG. 14, the node 16, upon receiving the APS byte, transmits the corresponding data along the first ring 30 by bypassing the faulty link connecting the nodes 11 and 12 based on the ring protection rule of a BLSR. In this case, the node 16 transmits, along the first ring 30 by bypassing the faulty link, only the data that is to be transmitted from the node 16 through the node 11 to the node 21 in a normal operational state. At the same time, the node 12, upon receiving the APS byte, switches an active redundant path segment for actually transmitting data, from the currently-used redundant path segment "16-11-21" including the nodes 16, 11, 21 to the alternative redundant path segment "21-22-12" including the nodes 21, 22, 12. For example, the node 12 outputs the data that has been transmitted from the node 16 by bypassing the faulty link based on the ring protection rule of a BLSR, to the alternative redundant path segment "21-22-12" including the nodes 21, 22, 12, as illustrated in FIG. 14.

Figure 15:
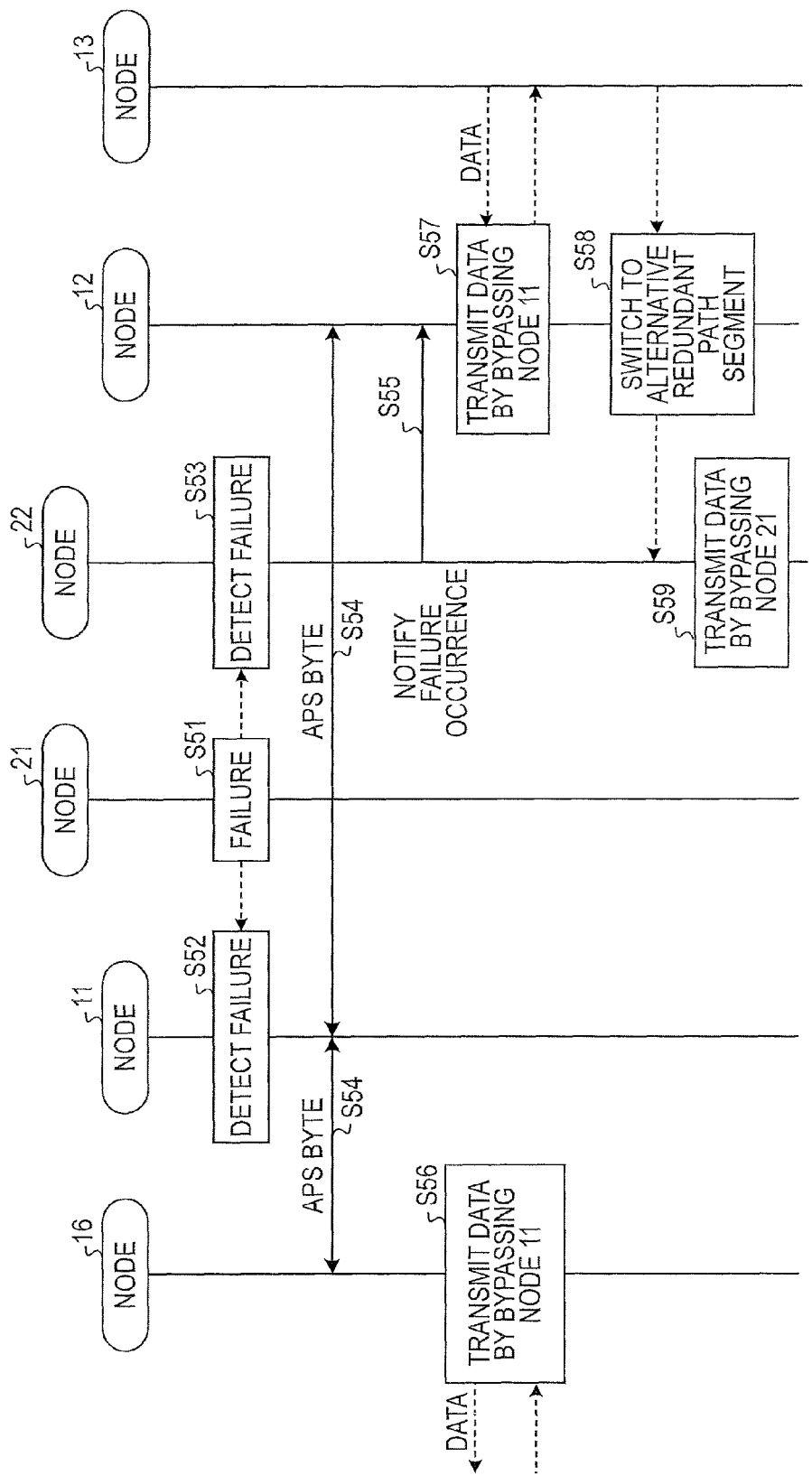
FIG. 15 is a diagram illustrating an example of an operational sequence for transmitting data by bypassing a faulty second connection node, according to an embodiment.

FIG. 15 is a diagram illustrating an example of an operational sequence for transmitting data by bypassing a faulty second connection node, according to an embodiment.

In operation S51, a failure has occurred at the second connection node 21 included in the second ring 40.

In operation S52, the first connection node 11 detects the failure occurrence of the second connection node 21.

In operation S53, the node 22 that is located adjacent to the second connection node 21 along the second ring 40 detects the failure occurrence of the second connection node 21, and inserts an APS byte into a frame to be transmitted along the second ring 40, and outputs the frame to the second ring 40, where the APS byte requests nodes located along the second ring 40 to switch an active path for actually transmitting data.

In operation S54, the first connection node 11, upon detecting the failure occurrence of the second connection node 21, inserts an APS byte into a frame to be transmitted along the first ring 30, and outputs the frame to the first ring 30, where the APS byte requests nodes located along the first ring 30 to switch an active path for actually transmitting data.

In operation S55, in response to the detection of the failure occurrence at the second connection node 21, the node 22 notifies the node 12 that the failure has occurred at the second connection node 21, using the alternative redundant path segment "21-22-12" including the nodes 21, 22, 12.

The node 16, upon receiving the APS byte, transmits the corresponding data along the first ring 30 by bypassing the faulty first connection node 11 based on the ring protection rule of a BLSR. In this case, the node 16 transmits only the data that is to be transmitted from the node 16 through the node 11 to the node 21 in a normal operating state, along the first ring 30 by bypassing the first connection node 11.

In operation S56, the node 12, upon receiving the APS byte, switches an active redundant path segment for actually transmitting data, from the currently-used redundant path segment "16-11-21" including the nodes 16, 11, 21 to the alternative redundant path segment "21-22-12" including the nodes 21, 22, 12.

In operation S57, the node 12, upon receiving both the APS byte and the notification indicating that the failure has occurred at the second connection node 21, transmits data stored in the corresponding storage area along the ring 30, by bypassing the node 11, based on the ring protection rule of a BLSR.

At the same time, in operation S58, the node 12 switches an active redundant path segment for actually transmitting data, from the currently-used redundant path segment "16-11-21" including the nodes 16, 11, 21 to the alternative redundant path segment "21-22-12" including the nodes 21, 22, 12.

In operation S59, the node 22 transmits the corresponding data that has been outputted by the node 12 to the alternative redundant path segment "21-22-12", along the second ring 40 by bypassing the second connection node 21 based on the ring protection rule of a BLSR.

Next, description will be given of a data flow regarding operations S51 to S57 of FIG. 15, with reference to FIGS. 16 and 17.

Figure 16:
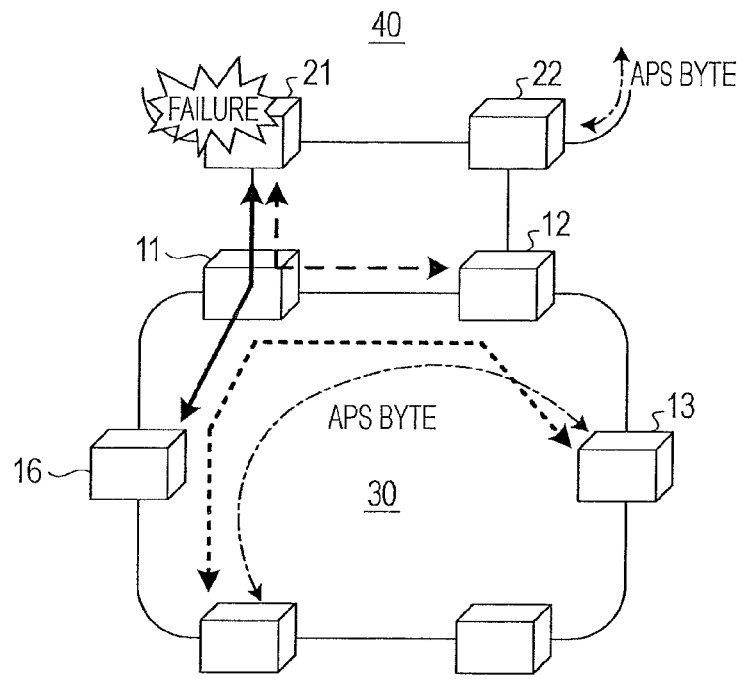
FIG. 16 is a schematic diagram illustrating an example of a data flow when a failure has occurred at a second connection node, according to an embodiment.
Figure 17:
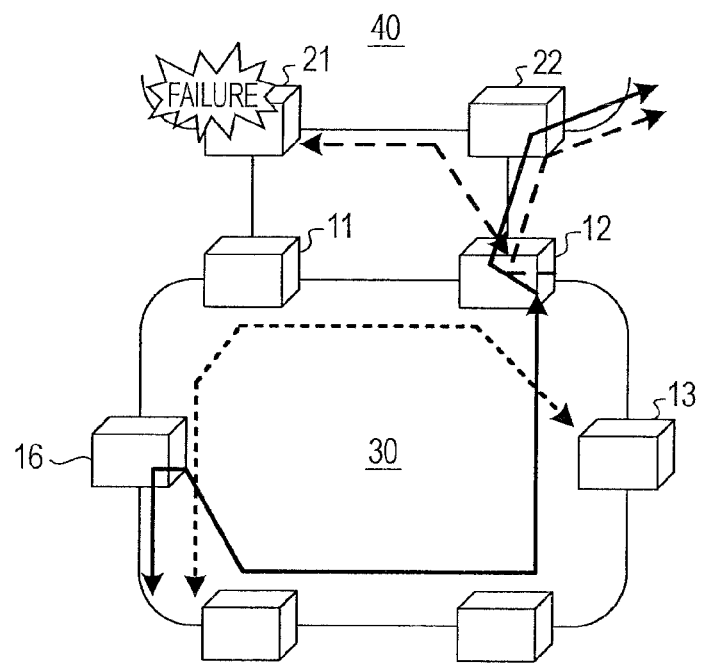
FIG. 17 is a schematic diagram illustrating an example of a data flow when a failure has occurred at a second connection node, according to an embodiment.

FIGS. 16 and 17 are schematic diagrams each illustrating an example of a data flow when a failure has occurred at a second connection node, according to an embodiment. In FIG. 16, when a failure has occurred at the second connection node 21 in the second ring 40, the first connection node 11 detects the failure occurrence of the second connection node 21. Then, the first connection node 11 inserts an APS byte into a frame to be transmitted along the first ring 30, and outputs the frame to the first ring 30.

On the other hand, when the failure has occurred at the second connection node 21, the node 22 that is located adjacent to the second connection node 21 along the second ring 40, detects the failure occurrence of the second connection node 21. Then, the node 22 inserts an APS byte into a frame to be transmitted along the second ring 40, and outputs the frame to the ring 40. In this case, the APS byte requests nodes located along the second ring 40 to switch an active path for actually transmitting data.

In FIG. 17, the node 16, upon receiving the APS byte, transmits the corresponding data along the ring 30 by bypassing the connection node 11 based on the ring protection rule of a BLSR. In this case, the node 16 transmits, along the first ring 30 by bypassing the first connection node 11, only the data that is to be transmitted from the node 16 through the node 11 to the second connection node 21 in a normal operating state.

Further, when the node 12 receives both the APS byte and the notification indicating that the failure has occurred at the second connection node 21, the node 12 switches an active redundant path segment for actually transmitting data, from the currently-used redundant path segment "16-11-21" including the nodes 16, 11, 21, to the alternative redundant path segment "21-22-12" including the nodes 21, 22, 12, while the corresponding data is transferred along the first ring 30 by bypassing the node 11 based on the ring protection rule of a BLSR. For example, the node 12 outputs the data that is to be transmitted from the node 16 through the first connection node 11 to the second connection node 21, by bypassing the node 11, to the alternative redundant path segment "21-22-12" including the nodes 21, 22, 12.

On the other hand, the node 22, upon receiving the APS byte, transmits the corresponding data along the second ring 40 by bypassing the second connection node 21 based on the ring protection rule of a BLSR. For example, the node 22 transmits the data that has been outputted from the node 12 to the alternative redundant path segment "21-22-12", along the second ring 40 by bypassing the faulty second connection node 21 based on the ring protection rule of a BLSR.

As described above, in a multi-ring transmission system according to an embodiment, among a plurality of nodes constituting a first ring, a first connection node that is adjacently connected to a second connection node in a second ring performs transmission of traffic information between the first connection node and adjacent nodes including the second connection node and a pair of adjacent nodes that are located adjacent to the first connection node along the first ring. When the traffic information received from the adjacent nodes includes an entry storing an output node identifier identifying the second connection node, the first connection node sets a plurality of redundant path segments each including the second connection node in the second ring. Thus, in the multi-ring transmission system according to the embodiment, the first connection node of the first ring may set a plurality of redundant path segments connecting the first and second rings, based on the traffic information received from the adjacent nodes without holding information on the configuration of the second ring. In other words, in the multi-ring transmission system according to the embodiment, a plurality of redundant path segments capable of achieving the function comparable to a BLSR scheme may be established with the reduced amount of information being held by the nodes constituting the first and second rings.

Further, in the multi-ring transmission system according to the embodiment, when a failure has occurred at the currently-used redundant path segment connecting first and second rings, data may be transmitted between the first and second rings using an alternative redundant path segment connecting the first and second rings by bypassing the faulty redundant path segment. Thus, in the multi-ring transmission system according to the embodiment, even when a failure has occurred at one of the plurality of redundant path segments connecting the first and second rings, data may be transmitted from a source node to a destination node using both the ring protection rule of a BLSR scheme and the alternative redundant path segment that was switched from the currently-used redundant path segment at which the failure has occurred.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A system to set redundant path segments in a multi-ring communication network, the system comprising:
    a first plurality of nodes communicably connected with each other through a first ring included in the multi-ring communication network; and
    a second plurality of nodes communicably connected with each other through a second ring included in the multi-ring communication network,
    wherein the first plurality of nodes includes a first connection node that is adjacently connected with a second connection node included in the second plurality of nodes, and
    the first connection node is configured to:
        receive traffic information from adjacent nodes including the second connection node and a pair of nodes that are located adjacent to the first connection node along the first ring, the traffic information storing a pair of input and output node identifiers in association with each of storage areas included in a frame to be transmitted in the multi-ring communication network, an input node identifier identifying an adjacent node from which first data stored in the each of storage areas is input, an output node identifier identifying an adjacent node to which the first data stored in the each of storage areas is output, and
        set a plurality of redundant path segments each including the second connection node, based on the received traffic information, when the received traffic information includes the output node identifier identifying the second connection node, the plurality of redundant path segments including a currently-used path segment
    wherein, when no failures occur at the plurality of redundant path segments, second data stored in a storage area that is associated with the output identifier identifying the second connection node in the traffic information is transmitted through the first ring and using one of the plurality of redundant path segments as an active path redundant segment for actually transmitting data, and
    when a failure occurs at the one of the plurality of redundant path segments, the active redundant path segment is switched from the currently-used path segment to an alternative one of the plurality of redundant path segments, and the second data is transmitted through the first ring, by bypassing a faulty portion and using the alternative one of the plurality of redundant path segments, and
    wherein the first ring and the second ring are configurable to operate a bi-directional line switched ring (BLSR) architecture in accordance with optical transmission.

2. A method to set redundant path segments in a multi-ring communication network including first and second rings, the first and second rings including first and second connection nodes, respectively, the first connection node being adjacently connected to the second connection node, the method comprising:
    receiving, by the first connection node, traffic information from adjacent nodes including the second connection node and a pair of nodes that are located adjacent to the first connection node along the first ring, the traffic information storing a pair of input and output node identifiers in association with each of storage areas included in a frame to be transmitted in the multi-ring communication network, an input node identifier identifying an adjacent node from which data stored in the each of storage areas is input, an output node identifier identifying an adjacent node to which the data stored in the each of storage areas is output; and setting, by the first connection node, a plurality of redundant path segments each including the second connection node, based on the received traffic information, when the received traffic information includes an entry storing the output node identifier identifying the second connection node, the plurality of redundant path segments including a currently-used path segment, wherein, when no failures occur at the plurality of redundant path segments, second data stored in a storage area that is associated with the output identifier identifying the second connection node in the traffic information is transmitted through the first ring and using one of the plurality of redundant path segments as an active path redundant segment for actually transmitting data, and when a failure occurs at the one of the plurality of redundant path segments, the active redundant path segment is switched from the currently-used path segment to an alternative one of the plurality of redundant path segments, and the second data is transmitted through the first ring, by bypassing a faulty portion and using the alternative one of the plurality of redundant path segments, and wherein the first ring and the second ring are configurable to operate a bi-directional line switched ring (BLSR) architecture in accordance with optical transmission.

3. An apparatus to set redundant path segments in a multi-ring communication network including first and second rings, the first and second rings including first and second connection nodes, respectively, the first connection node being adjacently connected to the second connection node, the apparatus serving as the first connection node, the apparatus comprising:

a memory to store traffic information storing a pair of input and output node identifiers in association with each of storage areas included in a frame to be transmitted in the multi-ring communication network, an input node identifier identifying an adjacent node from which data stored in the each of storage areas is input, an output node identifier identifying an adjacent node to which the data stored in the each of storage areas is output; and a processor to:

receive the traffic information from adjacent nodes including the second connection node and a pair of nodes that are located adjacent to the first connection node along the first ring, store the received traffic information in the memory, and set a plurality of redundant path segments each including the second connection node, based on the received traffic information, when the received traffic information includes the output node identifier identifying the second connection node, the plurality of redundant path segments including a currently-used path segment, wherein, when no failures occur at the plurality of redundant path segments, second data stored in a storage area that is associated with the output identifier identifying the second connection node in the traffic information is transmitted through the first ring and using one of the plurality of redundant path segments as an active path redundant segment for actually transmitting data, and when a failure occurs at the one of the plurality of redundant path segments, the active redundant path segment is switched from the currently-used path segment to an alternative one of the plurality of redundant path segments, and the second data is transmitted through the first ring, by bypassing a faulty portion and using the alternative one of the plurality of redundant path segments, and wherein the first ring and the second ring are configurable to operate a bi-directional line switched ring (BLSR) architecture in accordance with optical transmission.

* * * * *

UNITED STATES PATENT AND TRADEMARK OFFICE
CERTIFICATE OF CORRECTION

| | | |
|---|---|---|
| PATENT NO. | : 8,873,380 B2 | Page 1 of 1 |
| APPLICATION NO. | : 13/401209 | |
| DATED | : October 28, 2014 | |
| INVENTOR(S) | : Yuji Tochio | |

It is certified that error appears in the above-identified patent and that said Letters Patent is hereby corrected as shown below:

On the Title Page

Column 2, Item [57] (Abstract), Line 4, Delete "nods," and insert -- nodes, --, therefor.

In the Specification

Column 1, Line 9, Delete "2001-" and insert -- 2011- --, therefor.

Signed and Sealed this
Third Day of March, 2015

Michelle K. Lee
*Deputy Director of the United States Patent and Trademark Office*